United States Patent
Michaels et al.

(10) Patent No.: US 12,209,997 B2
(45) Date of Patent: Jan. 28, 2025

(54) INSPECTION SYSTEMS AND METHODS FOR SEALING SURFACES

(71) Applicant: RAYTHEON TECHNOLOGIES CORPORATION, Farmington, CT (US)

(72) Inventors: Derek J. Michaels, Southington, CT (US); Elizabeth F. Vinson, Broad Brook, CT (US); Zhong Ouyang, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 289 days.

(21) Appl. No.: 17/730,114

(22) Filed: Apr. 26, 2022

(65) Prior Publication Data
US 2023/0341356 A1   Oct. 26, 2023

(51) Int. Cl.
*G01N 29/34*   (2006.01)
*G06T 7/00*   (2017.01)

(52) U.S. Cl.
CPC ........ *G01N 29/348* (2013.01); *G06T 7/0004* (2013.01); *G01N 2291/2693* (2013.01); *G06T 2207/30164* (2013.01)

(58) Field of Classification Search
CPC ........ G01N 29/348; G01N 2291/2693; G01N 25/72; G06T 7/0004; G06T 2207/30164; F01D 21/003; F01D 5/34; G01H 9/00
See application file for complete search history.

(56) References Cited

U.S. PATENT DOCUMENTS

| | | | |
|---|---|---|---|
| 5,942,690 A | 8/1999 | Shvetsky | |
| 6,336,844 B1 * | 1/2002 | Duquenne | B24C 1/10 451/910 |
| 7,297,952 B2 | 11/2007 | Raulerson et al. | |
| 8,089,028 B2 | 1/2012 | Rose | |
| 2004/0089811 A1 * | 5/2004 | Lewis | G01N 29/2418 250/341.6 |
| 2004/0217289 A1 * | 11/2004 | Raulerson | G01N 29/228 250/341.6 |
| 2008/0022775 A1 * | 1/2008 | Sathish | G01N 25/72 73/606 |
| 2011/0209347 A1 * | 9/2011 | Deak | F03D 1/06 29/889.1 |
| 2012/0266680 A1 * | 10/2012 | Boyer | G01B 11/2545 73/655 |

FOREIGN PATENT DOCUMENTS

JP   2001170865   6/2001

OTHER PUBLICATIONS

European Patent Office, European Search Report dated Sep. 15, 2023 in Application No. 23164144.0.

* cited by examiner

*Primary Examiner* — Tarun Sinha
(74) *Attorney, Agent, or Firm* — SNELL & WILMER L.L.P.

(57) ABSTRACT

An inspection device is disclosed herein. The inspection device may comprise: a support structure; a motor; a shaft operably coupled to the motor, the shaft extending from a first side of the support structure to a second side of the support structure, the shaft configured to couple to a bladed rotor; an optical device moveably coupled to the support structure; and a broad-band energy source configured to generate acoustic energy through the bladed rotor during inspection.

20 Claims, 12 Drawing Sheets

SECT A-A

INSPECTION SYSTEMS AND METHODS FOR SEALING SURFACES

FIELD

The present disclosure relates to inspection methods and systems, and more particularly, the inspection methods and systems for sealing surface in a gas turbine engine.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of blades. The rotor may be an integrally bladed rotor ("IBR") or a mechanically bladed rotor.

The rotor disk and blades in the IBR are one piece (i.e., integral) with the blades spaced around the circumference of the rotor disk. Conventional IBRs may be formed using a variety of technical methods including integral casting, machining from a solid billet, or by welding or bonding the blades to the rotor disk.

SUMMARY

An inspection device is disclosed herein. The inspection device may comprise: a support structure; a motor; a shaft operably coupled to the motor, the shaft extending from a first side of the support structure to a second side of the support structure, the shaft configured to couple to a bladed rotor; an optical device moveably coupled to the support structure; and a broad-band energy source configured to generate acoustic energy through the bladed rotor during inspection.

In various embodiments, the inspection device further comprises a control arm configured to place the broad-band energy source in contact with the bladed rotor during inspection. The inspection device may further comprise an acoustic frequency generator in operable communication with the broad-band energy source. The inspection device may further comprise a controller operably coupled to the motor, the optical device and the acoustic frequency generator. The controller may be configured to: command the control arm to place the broad-band energy source in contact with the bladed rotor; command the acoustic frequency generator to generate the acoustic energy through the broad-band energy source; c command the optical device to capture thermal images of a knife edge of the bladed rotor; and determine a defect shape (e.g., a defect size, a defect orientation, etc.) and a defect location based on data from the optical device. The inspection device may further comprise a user interface. The controller may be further configured to output through the user interface, the defect location in response to determining the defect shape and the defect location. The controller may be further configured to generate a three dimensional model with the defect shape in the defect location. The controller may be further configured to generate a point cloud with the defect shape in the defect location based on scanning the bladed rotor.

An article of manufacture is disclosed herein. The article of manufacture may include a tangible, non-transitory computer-readable storage medium having instructions stored thereon that, in response to execution by a processor, cause the processor to perform operations comprising: commanding, by the processor, placement of a broad-band energy source in contact with an integrally bladed rotor (IBR) proximate a sealing surface, the sealing surface having a coating disposed at least partially thereon; commanding, by the processor, an acoustic frequency generator to generate acoustic energy through the broad-band energy source; command, by the processor, an optical device to capture thermal images while the acoustic energy is generated; and determine, by the processor, a defect shape and a defect location based on captured thermal images from the optical device.

In various embodiments, the operations further comprise generating, by the processor, a three-dimensional model with the defect shape in the defect location. In various embodiments, the three-dimensional model is a point cloud. In various embodiments, the operations further comprise transmitting the three-dimensional model to an IBR analysis system.

In various embodiments, the operations further comprise outputting, by the processor and through a user interface, the defect location, a defect size, and a defect orientation.

A method is disclosed herein. The method may comprise: commanding, by a processor, an acoustic energy to be applied to a bladed rotor proximate a knife edge of the bladed rotor; commanding, by the processor, capturing of a thermal image data while applying the acoustic energy; and determining, by the processor and based on the thermal image data, whether the knife edge has a defect, the knife edge having a coating disposed at least partially thereon.

In various embodiments, the method may further comprise commanding, by the processor, removal the coating locally in response to determining a defect location of the defect. The method may further comprise commanding, by the processor, repairing of the defect. The method may further comprise re-coating the tip of the knife edge locally.

In various embodiments, the method may further comprise commanding, by the processor, scanning the bladed rotor and generating a three-dimensional model with the defect based on the scanning and the thermal image data. The three-dimensional model may be generated at least in part from a point cloud generated in response to scanning the bladed rotor.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
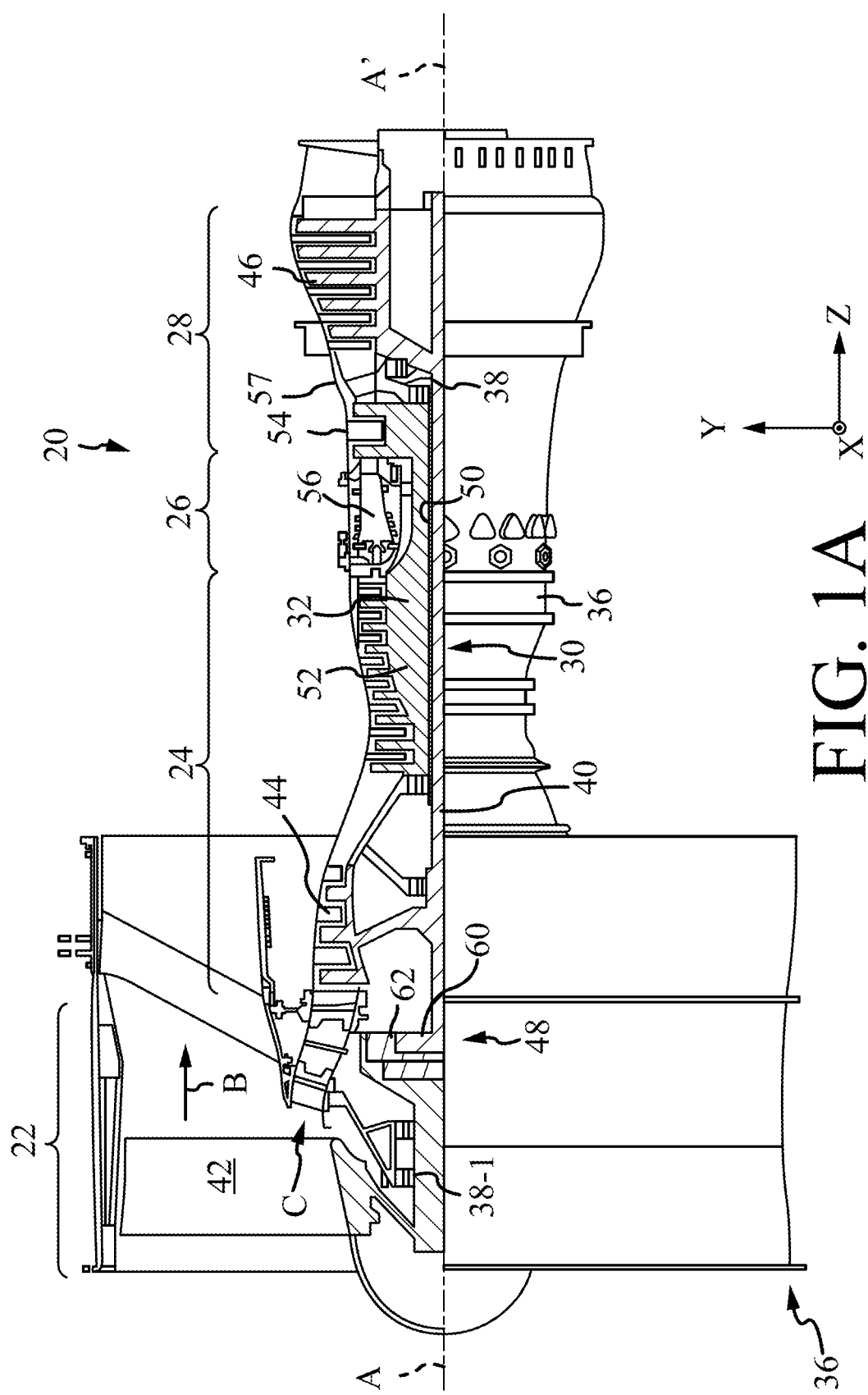
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Figure 1B:
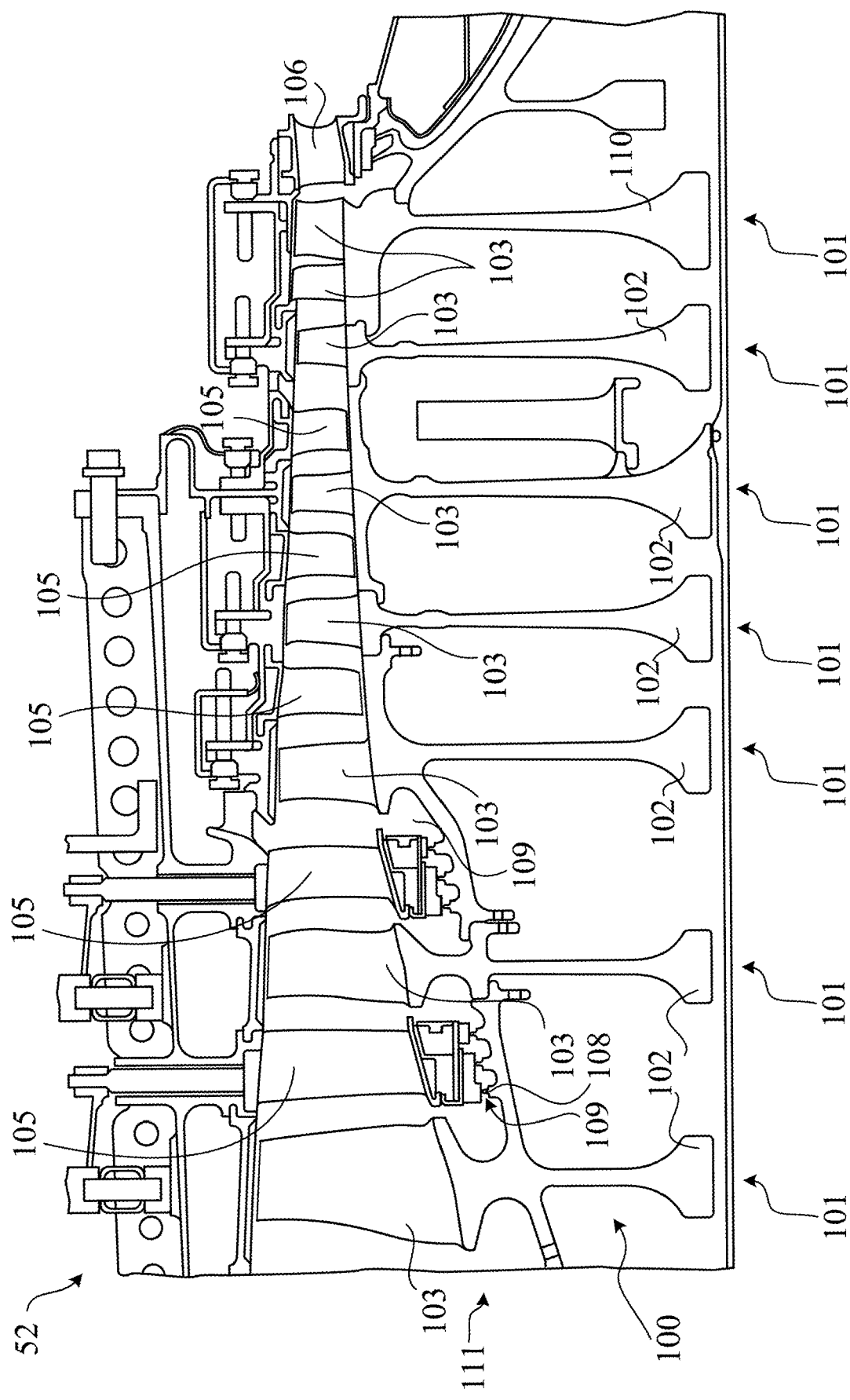
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include an integrally bladed rotor ("IBR") 100, such that the blades 103 and rotor disks 102 are formed from a single integral component (i.e., a monolithic component formed of a single piece). The blades 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and stator stages 105, each blade stage in the plurality of blade stages 101 including the IBR 100 and still be within the scope of this disclosure. In various embodiments, the plurality of blade stages 101 form a stack of IBRs 110, which define, at least partially, a rotor module 111 of the high pressure compressor 52 of the gas turbine engine 20.

In various embodiments, an IBR 100 disclosed herein may comprise a knife edge 108 of a knife edge seal assembly 109. The knife edge 108 is disposed between adjacent rotor stages in the plurality of blade stages 101 and configured to interface with a vane assembly in the plurality of vane stages 105. In various embodiments, the knife edge seal assembly 109 is configured to seal air flow from core flow path C from FIG. 1A during operation of the gas turbine engine 20 from FIG. 1A.

Figure 2A:
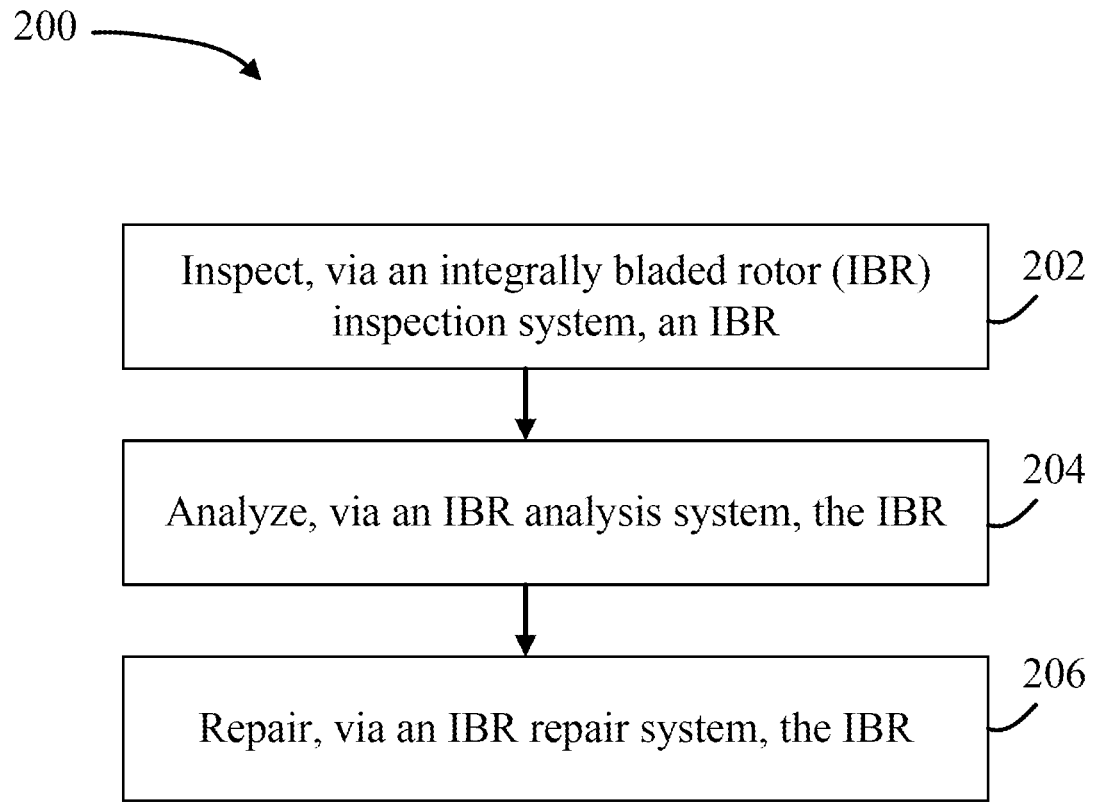
FIG. 2A illustrates a repair process for an integrally bladed rotor, in accordance with various embodiments.

Referring now to FIG. 2A, a method 200 for repairing an IBR 100 from FIG. 1B from a compressor section (e.g., compressor section 24) of a gas turbine engine 20 from FIG. 1A is illustrated, in accordance with various embodiments. For example, after a predetermined number of flight cycles, or due to an unscheduled maintenance, a gas turbine engine 20 from FIG. 1A is in operation, the method 200 may be performed for one or more of IBR 100 in the compressor section 24 of the gas turbine engine 20. In various embodiments, method 200 may be performed for IBRs 100 from several gas turbine engines (e.g., in accordance with gas turbine engine 20), which may facilitate various potential repair options as described further herein.

The method 200 comprises inspecting, via an IBR inspection system, an IBR 100 (step 202). As described further herein, step 202 may be performed for numerous IBRs 100 prior to proceeding to step 204. In various embodiments, step 202 may be performed for a single IBR 100 prior to proceeding to step 204. The present disclosure is not limited in this regard.

In various embodiments, inspecting the IBR comprises scanning, via the IBR inspection system, the IBR 100. In this regard, the IBR inspection system may comprise an optical scanner (e.g., structured light scanners, such as white light scanners, structured blue light scanners, or the like) and/or a coordinate-measuring machine. The present disclosure is not limited in this regard. In response to scanning the IBR 100, a digital representation of the IBR 100 (e.g., a point cloud, a surface model, or the like) is received by a controller and converted to a three-dimensional model (e.g., a computer Aided Design (CAD) model or Finite Element Model (FEM). The three-dimensional model may be utilized for analyzing the IBR 100 in step 204 of method 200.

The method 200 further comprises analyzing, via an IBR analysis system, the IBR (step 204). In various embodiments, by inspecting a plurality of IBRs in step 202, a system level analysis of various repair options may be performed in step 204. For example, the three-dimensional model produced from step 202 may be used as an input for blade level analysis (e.g., low-cycle fatigue, high cycle fatigue, Goodman diagram analysis, frequency, modal assurance criterion, etc.), stage level analysis (e.g., mistuning, aerodynamic performance, fatigue, imbalance, solidity, area and speed rotor sizing, etc.), and/or module level analysis (e.g., aerodynamic performance, compressor stack stiffness, clocking, clearances, axial gapping, imbalance, secondary flow influence, etc.). In this regard, by generating a three-dimensional model via step 202 outlined above, various forms of analysis may be performed to generate an optimal repair configuration (e.g., optimized for aerodynamic performance, optimized for cost of repair, etc.). The optimal repair configuration may be for an airfoil of a respective IBR 100, for the respective IBR 100 as a whole, or for stack of IBRs 110 from FIG. 1B. The present disclosure is not limited in this regard.

The method 200 further comprises repairing, via an IBR repair system, the IBR (step 206). In various embodiments, a repair model may be generated from the analyzing step 204 of method 200. In various embodiments, a plurality of repair models may be generated based on various factors as outlined previously herein. In this regard, a repair process may be determined based on the analyzing step 204. In various embodiments, the repair performed in step 206 may be a partial repair. For example, in the analyzing step 204, optimal repair configurations for remaining life of the IBR 100 may be determined as well. For example, typical repairs are determined based on the IBR 100 meeting manufacturing tolerances/specifications and meeting full life (e.g., 25,000 flight cycles, 50,000 flight cycles or the like). If the IBR 100 is set for only 10,000 additional flight cycles of when the IBR 100 is originally designed for 50,000 flight cycles, the analysis in step 204 may account for that and provide a partial repair option that meets full life to accomplish a faster and/or less expensive repair.

Figure 2B:
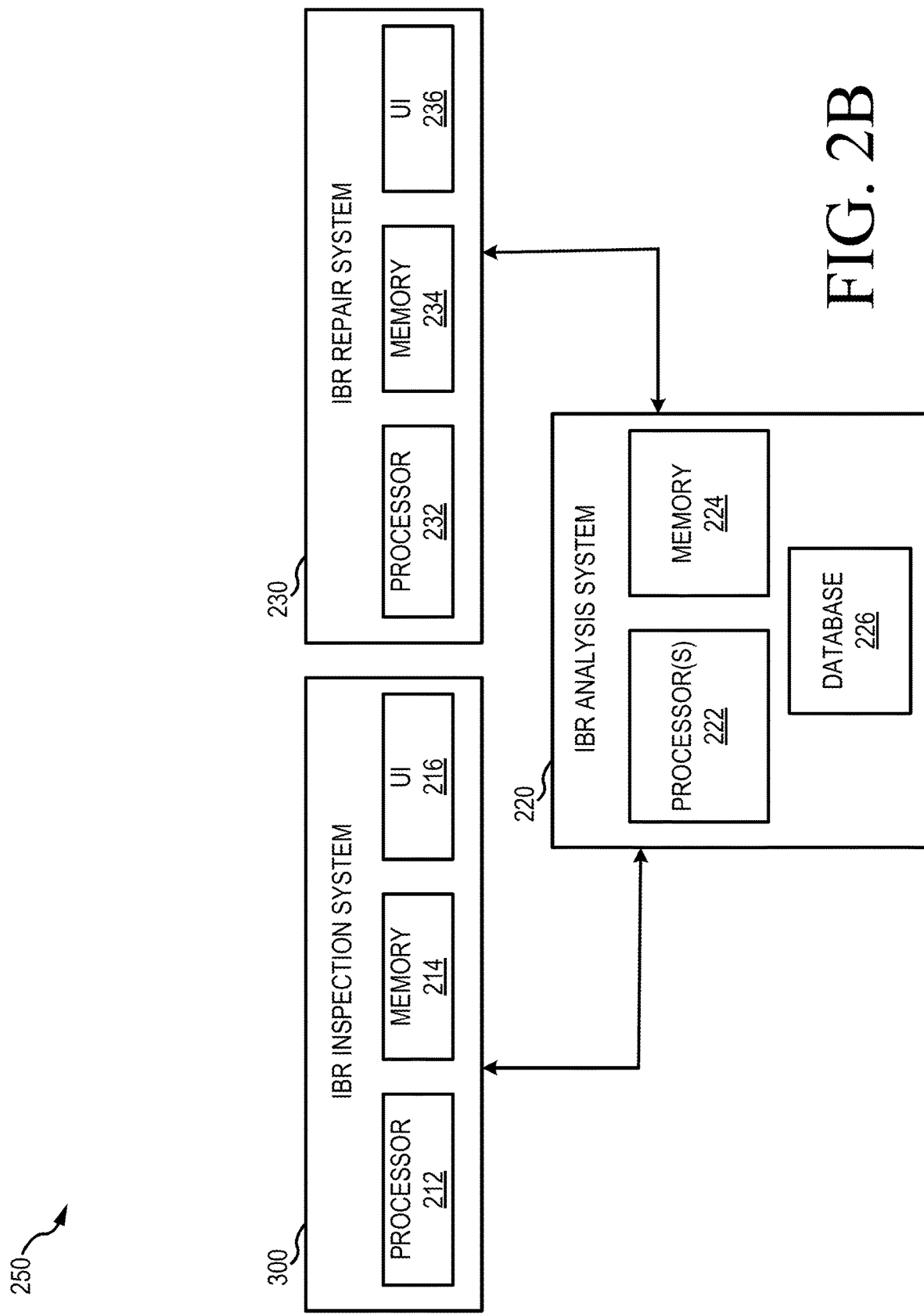
FIG. 2B illustrates a schematic view of a system for repairing an integrally bladed rotor, in accordance with various embodiments.

Referring now to FIG. 2B, a system 250 for repairing an IBR 100 is illustrated, in accordance with various embodiments. In various embodiments, the system 250 includes an IBR inspection system 300, an IBR analysis system 220, and an IBR repair system 230. Although illustrated as separate systems with separate processors (e.g., processors 212, 222, 232), the present disclosure is not limited in this regard. For example, the system 250 may include a single processor, a single memory, and a single user interface and still remain within the scope of this disclosure.

Similarly, although IBR inspection system 300 and IBR repair system 230 are illustrated as separate systems with separate processors, memories and user interfaces, the present disclosure is not limited in this regard. For example, the IBR inspection system 300 and the IBR repair system 230 may be combined into a single system that communicates with the IBR analysis system 220, in accordance with various embodiments.

In various embodiments, the IBR analysis system 220 may include one or more processors 222. In this regard, the IBR analysis system 220 may be configured to process a significant amount of data during the analysis step 204 from method 200. In this regard, the IBR analysis system 220 may be configured for remote commuting (e.g., cloud-based computing), or the like. Thus, a processing time and a volume of data analyzed may be greatly increased relative to typical repair systems, in accordance with various embodiments.

In various embodiments, the IBR inspection system 300, the IBR analysis system 220, and the IBR repair system 230 each include a computer system comprising a processor (e.g., processor 212, processor(s) 222, and/or processor 232) and a memory (e.g., memory 214, memory 224, memory 234). The IBR inspection system 300 and the IBR repair system 230 may each comprise a user interface (UI) (e.g., UI 216, UI236). In various embodiments, the IBR inspection system 300 and the IBR repair system 230 may utilize a single user interface to control both systems. The present disclosure is not limited in this regard.

The IBR analysis system 220 may further comprise a database 226. In various embodiments, the database 226 comprises various stored data for use in the IBR analysis system 220. The database 226 may include an inspected IBR database (e.g., with data from various prior inspected IBRs), a repair data database (e.g., with data from various prior repairs performed/approved), a load data database (e.g., with engine load data from structural and/or aerodynamic analysis), a test data database (e.g., with engine specific test data used for validation of structural and/or aerodynamic analysis), a design data database (e.g., with design models having nominal dimensions according to a product definition of the IBR 100), and/or a material data database (e.g., with material for each component utilized in an analysis step 204 of method 200), in accordance with various embodiments.

System 250 may be configured for inspecting (e.g., step 202 of method 200), analyzing (e.g., step 204 of method 200), and repairing (e.g., step 206 of method 200) an IBR 100, in accordance with various embodiments. In this regard, a repair process for an IBR 100 may be fully automated, or nearly fully automated, in accordance with various embodiments, as described further herein.

In various embodiments, and as shown in FIG. 1, systems 300, 220, 230 may each store a software program configured to perform the methods described herein in a respective memory 214, 224, 234 and run the software program using the respective processor 212, 222, 232. The systems 300, 220, 230 may include any number of individual processors 212, 222, 232 and memories 214, 224, 234. Various data may be communicated between the systems 300, 220, 230 and a user via the user interfaces (e.g., UI 216, UI 236). Such information may also be communicated between the systems 300, 220, 230 and external devices, database 226, and/or any other computing device connected to the systems 300, 220, 230 (e.g., through any network such as a local area network (LAN), or wide area network (WAN) such as the Internet).

In various embodiments, systems 300, 220, 230 depicted in FIG. 2B, each processor 212, 222, 232 may retrieve and executes instructions stored in the respective memory 214, 224, 234 to control the operation of the respective system 300, 220, 230. Any number and type of processor(s) (e.g., an integrated circuit microprocessor, microcontroller, and/or digital signal processor (DSP)), can be used in conjunction with the various embodiments. The processor 212, 222, 232 may include, and/or operate in conjunction with, any other suitable components and features, such as comparators, analog-to-digital converters (ADCs), and/or digital-to-analog converters (DACs). Functionality of various embodiments may also be implemented through various hardware components storing machine-readable instructions, such as application-specific integrated circuits (ASICs), field-programmable gate arrays (FPGAs) and/or complex programmable logic devices (CPLDs).

The memory 214, 224, 234 may include a non-transitory computer-readable medium (such as on a CD-ROM, DVD-ROM, hard drive or FLASH memory) storing computer-readable instructions stored thereon that can be executed by the processor 212, 222, 232 to perform the methods of the present disclosure. The memory 144 may include any combination of different memory storage devices, such as hard drives, random access memory (RAM), read only memory (ROM), FLASH memory, or any other type of volatile and/or nonvolatile memory.

The system 300, 230 may receive and display information via a respective user interface (e.g., UI 216 and/or UI 236). The user interfaces (e.g., UI 216 and/or UI 236) include various peripheral output devices (such as monitors and printers), as well as any suitable input or control devices (such as a mouse and keyboard) to allow users to control and interact with the software program.

In various embodiments, IBR inspection system 300 and IBR repair system 230 may each be in electronic communication with IBR analysis system 220, directly or via a respective user interface (e.g., UI 216 and/or UI 236). IBR inspection system 300 and IBR repair system 230 may comprise any suitable hardware, software, and/or database components capable of sending, receiving, and storing data. For example, IBR inspection system 300 and/or IBR repair system 230 may comprise a personal computer, personal digital assistant, cellular phone, smartphone (e.g., those running UNIX-based and/or Linux-based operating systems such as IPHONE®, ANDROID®, and/or the like), IoT device, kiosk, and/or the like. IBR inspection system 300 and/or IBR repair system 230 may comprise an operating system, such as, for example, a WINDOWS® mobile operating system, an ANDROID® operating system, APPLE® IOS®, a LINUX® operating system, and the like. IBR inspection system 300 and/or IBR repair system 230 may also comprise software components installed on IBR inspection system 300 and/or IBR repair system 230 and configured to enable access to various system 250 components. For example, IBR inspection system 300 and/or IBR repair system 230 may comprise a web browser (e.g., MICROSOFT INTERNET EXPLORER®, GOOGLE CHROME®, APPLE SAFARI® etc.), an application, a micro-app or mobile application, or the like, configured to allow the IBR inspection system 300 and/or IBR repair system 230 to access and interact with IBR analysis system 220 (e.g., directly or via a respective UI, as discussed further herein).

Figure 3A:
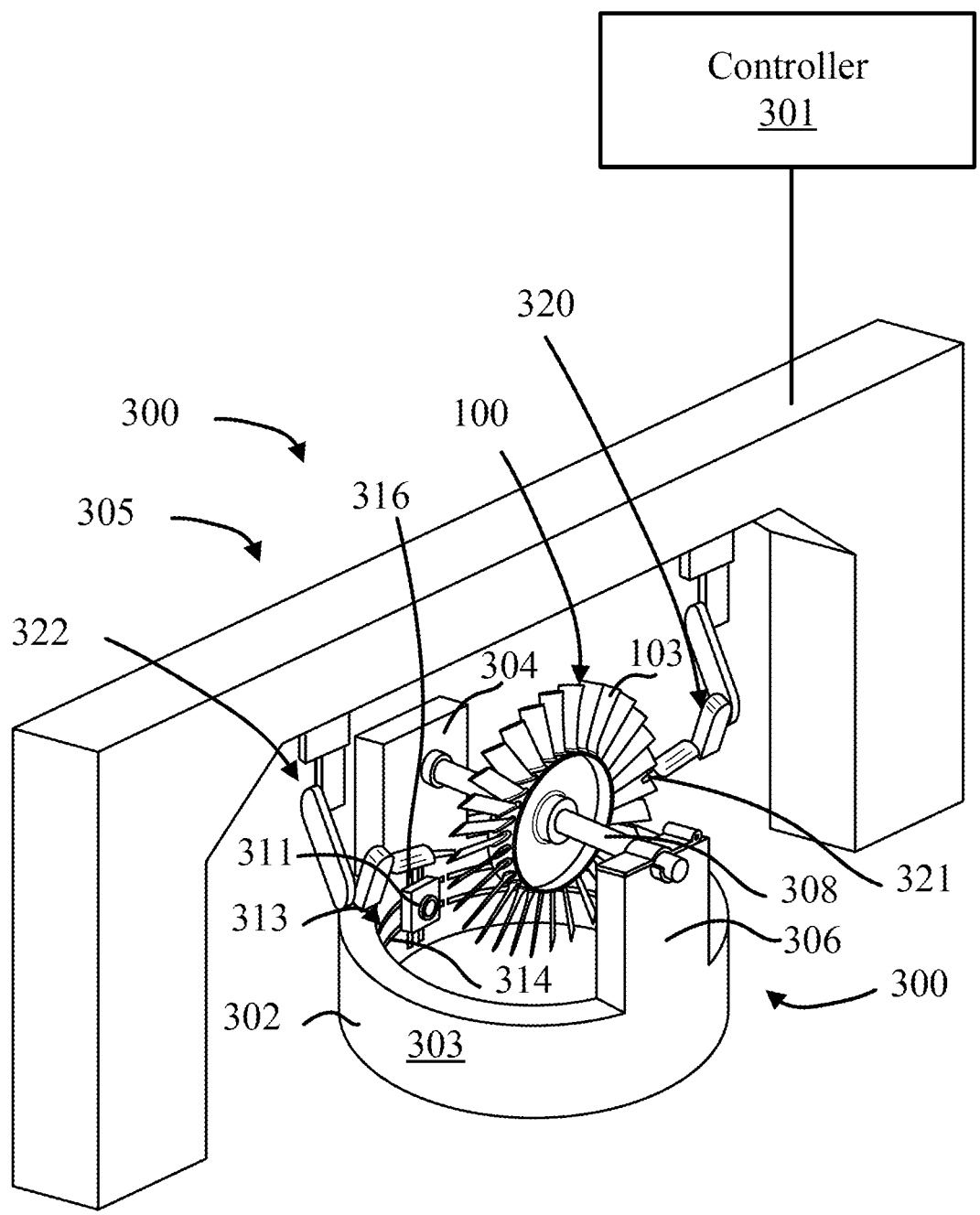
FIG. 3A illustrates a perspective view of a bladed rotor inspection system, in accordance with various embodiments.
Figure 3B:
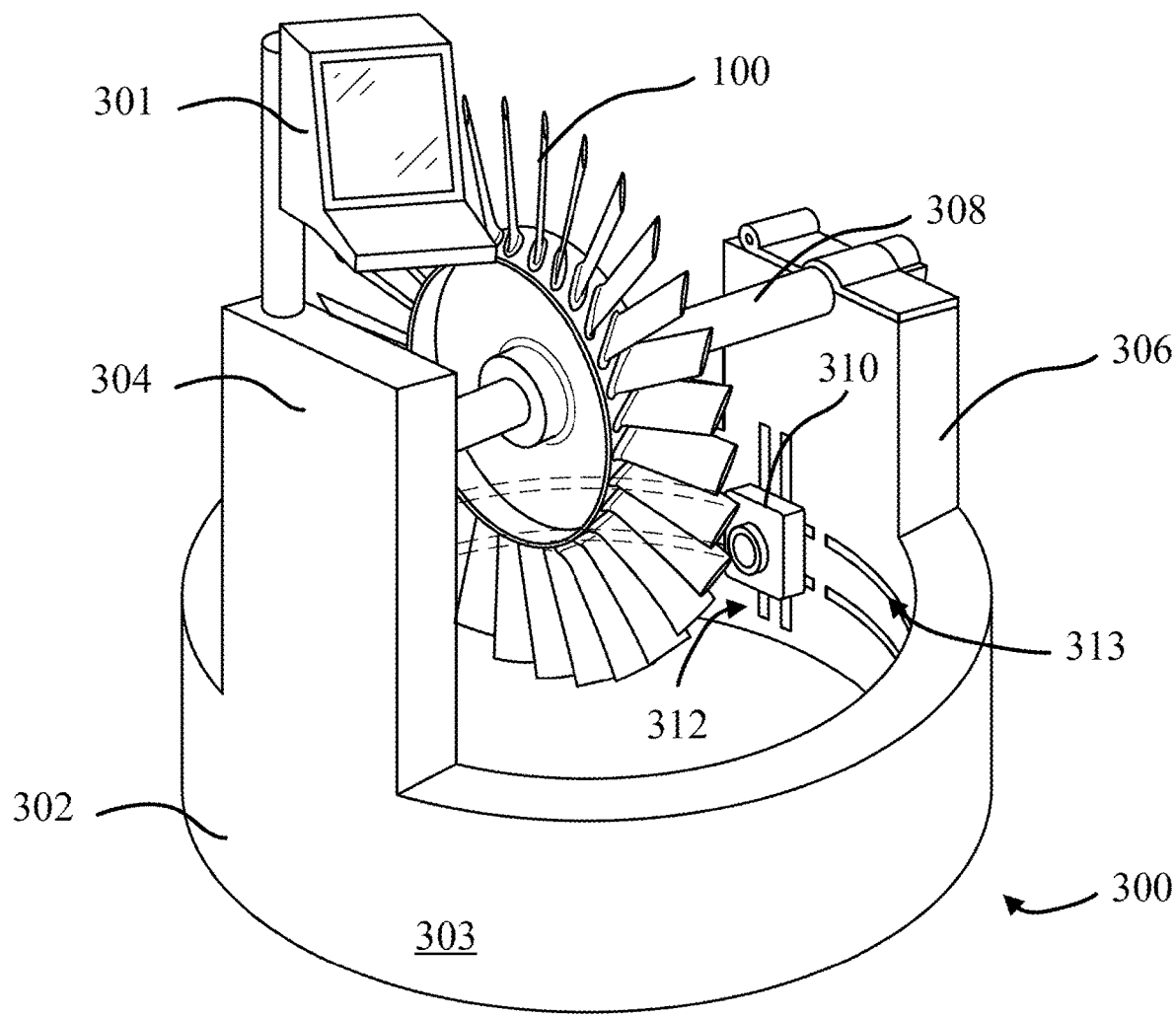
FIG. 3B illustrates a perspective view of a bladed rotor inspection system, in accordance with various embodiments.
Figure 4:
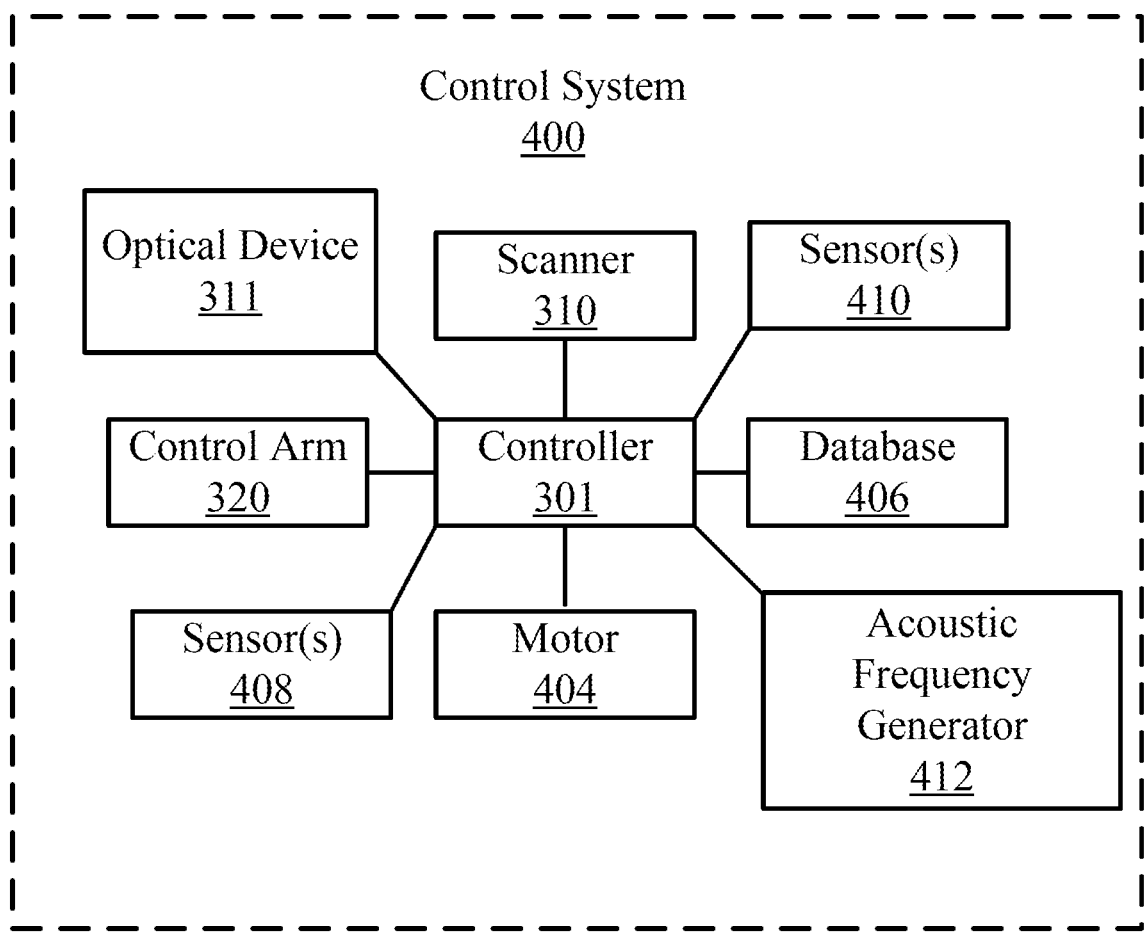
FIG. 4 illustrates a schematic view of a control system for a bladed rotor inspection system, in accordance with various embodiments.

Referring now to FIGS. 3A, 3B, and 4, a perspective view of an inspection system 300 for use in an inspection step 202 of method 200 from FIG. 2 and a control system 400 for the inspection system 300 (FIG. 4) are illustrated in accordance with various embodiments. In various embodiments, the inspection system 300 comprises a controller 301, a support structure 302, a shaft 308, an optical device 311, and a broad-band acoustic energy source 321. In various embodiments, the control system 400 comprises the controller 301, the optical device 311, a memory 402, a motor 404, a database 406, sensor(s) 408, sensor(s) 410, and control arm 320. In various embodiments, the inspection system 300 comprises a bladed rotor inspection device 305. The broad-band acoustic energy source 321 may be coupled to a control arm 320. In various embodiments, the broad-band acoustic energy source 321 is integrated with the control arm 320. In various embodiments, the control arm 320 is configured to removably couple to the broad-band acoustic energy source 321 and operably couple to other inspection tools (e.g., scanner(s) 310, probes, or the like). The present disclosure is not limited in this regard.

In various embodiments, the support structure 302 comprises a base 303, a first vertical support 304, a second vertical support 306. In various embodiments, the base 303 may be annular in shape. Although illustrated as being annular, the present disclosure is not limited in this regard. For example, the base 303 may be semi-annular in shape, a flat plate, or the like. In various embodiments, the vertical supports 304, 306 extend vertically upward from the base 303 on opposite sides of the base (e.g., 180 degrees apart, or opposite sides if the base 303 where a square plate). The shaft 308 extends from the first vertical support 304 to the second vertical support 306. The shaft 308 may be rotatably coupled to the motor 404, which may be disposed within the first vertical support 304, in accordance with various embodiments. The shaft 308 may be restrained vertically and horizontally at the second vertical support 306 but free to rotate relative to the second vertical support about a central longitudinal axis of the shaft 308. In various embodiments, a bearing assembly may be coupled to the second vertical support 306 to facilitate rotation of the shaft, in accordance with various embodiments.

In various embodiments, the IBR 100 to be inspected in accordance with the inspection step 202 of the method 200 via the inspection system 300 may be coupled to the shaft 308 (e.g., via a rigid coupling, or the like). The present disclosure is not limited in this regard, and the shaft 308 may be coupled to the IBR 100 to be inspected by any method known in the art and be within the scope of this disclosure.

In various embodiments, the optical device 311 is operably coupled to a track system 313. In various embodiments, the track system 313 may comprise a curved track 314 and a vertical track 316. The vertical track 316 may slidingly couple to the vertical track 316 (e.g., via rollers or the like). The optical device 311 may be slidingly coupled to the vertical track 316 (e.g., via a conveyor belt, linkages or the like). In various embodiments, the optical device 311 is configured to extend from the track system 313 towards the IBR 100 during inspection of the IBR 100 in accordance with step 202 of method 200. In this regard, the inspection system 300 may further comprise a robot arm (e.g., control arm 322), an actuator (e.g., configured to extend from the track system towards the IBR 100), or the like. Although described herein with tracks 314, 316, and a robot arm or actuator, the present disclosure is not limited in this regard. For example, any electronically controlled (e.g., wireless or wired) component configured to move the optical device 311 in relative to the IBR 100 is within the scope of this disclosure (e.g., a three-axis or five-axis control machine or the like).

Although illustrated as being coupled to a control arm 320, the broad-band acoustic energy source 321 is not limited in this regard. For example, the broad-band acoustic energy source 321 may be coupled to a track system (e.g., track system 312) or the like.

In various embodiments, the scanner 310 is also coupled to a track system 312. The track system 312 may be in accordance with the track system 313. In various embodiments, the optical device 311 is stationary and the IBR 100 being inspected is moveable along three-axis, five-axis, or the like. The present disclosure is not limited in this regard.

In various embodiments, the scanner 310 comprises a coordinate measuring machine (CMM), a mechanical scanner, a laser scanner, a structured scanner (e.g., a white light scanner, a blue light scanner, etc.), a non-structured optical scanner, a non-visual scanner (e.g., computed tomography), or the like. In various embodiments, the scanner 310 is a blue light scanner. In various embodiments, the scanner 310 may be swapped with another scanner at any point during an inspection step 202 as described further herein. In various embodiments, the inspection system 300 may be configured to swap the scanner 310 with a different scanner during the inspection step 202 of method 200 as described further herein.

A "blue light scanner" as disclosed herein refers to a non-contact structured light scanner. The blue light scanner may have a scan range of between 100×75 $mm^2$-400×300 $mm^2$, in accordance with various embodiments. In various embodiments, an accuracy of the blue light scanner may be between 0.005 and 0.015 mm. In various embodiments, the blue light scanner be able to determine distances between adjacent points in the point cloud of between 0.04 and 0.16 mm as measured across three axes. In various embodiments, a volume accuracy of the blue light scanner may be approximately 0.8 mm/m. In various embodiments, a scan depth may be between approximately 100 and 400 mm. In various embodiments, the blue light scanner may comprise a light source including a blue LED. In this regard, the blue light scanner may be configured to emit an average wavelength between 400 and 450 nm, in accordance with various embodiments. Although described with various specifications herein, the blue light scanner is not limited in this regard, and one skilled in the art may recognize the parameters of the blue light scanner may extend outside the exemplary ranges. Use of a blue light scanner provides a high resolution point cloud for a three dimensional object.

The controller 301 may be integrated into computer system of the inspection system 300 (e.g., in processor 212 and/or memory 214 from FIG. 2B). In various embodiments, the controller 301 may be configured as a central network element or hub to various systems and components of the control system 400. In various embodiments, controller 301 may comprise a processor (e.g., processor 212). In various embodiments, controller 301 may be implemented as a single controller (e.g., via a single processor 212 and associated memory 214). In various embodiments, controller 301 may be implemented as multiple processors (e.g., a main processor and local processors for various components). The controller 301 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 301 may comprise a processor configured to implement various logical operations in response to execution of instructions, for example, instructions stored on a non-transitory, tangible, computer-readable medium configured to communicate with the controller 301.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the optical device 311 comprises an infrared camera and/or a fiber optic camera. In various embodiments, the optical device 311 is configured for capacitive-coupled discharge (CCD). Such devices may be particularly sensitive in the infrared range. For example, infrared as disclosed herein refers to emitting light with wavelengths between 780 nm and 1 mm. Excitation of any defective features is dependent upon a location of the defect, the geometry of the structure and the intensity and spectrum of acoustic energy. Transfer of mechanical energy through the IBR 100 has a frequency dependence. To ensure a thorough evaluation of defects, the broad-band energy source 321 is utilized in combination with the optical device 311. Use of a single frequency energy source may limit the inspectability of the entire IBR 100. In various embodiments, the broad based energy source 13 may emit at least two non-harmonically related frequencies. As disclosed herein, "non-harmonically related" refers to at least two frequencies which are not integer multiples of each other.

Figure 5A:
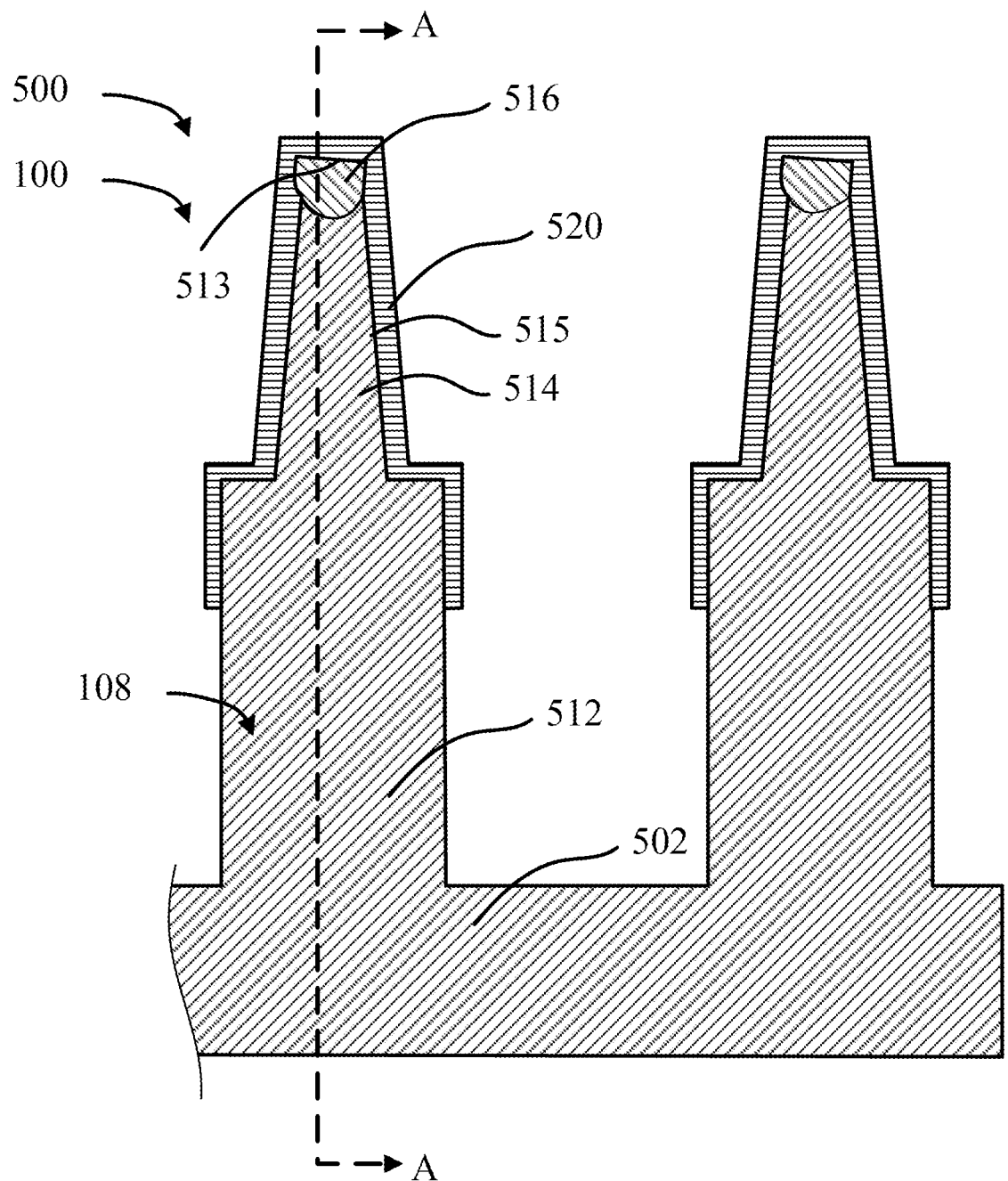
FIG. 5A illustrates a cross-sectional view of a knife edge for a bladed rotor, in accordance with various embodiments.
Figure 5B:
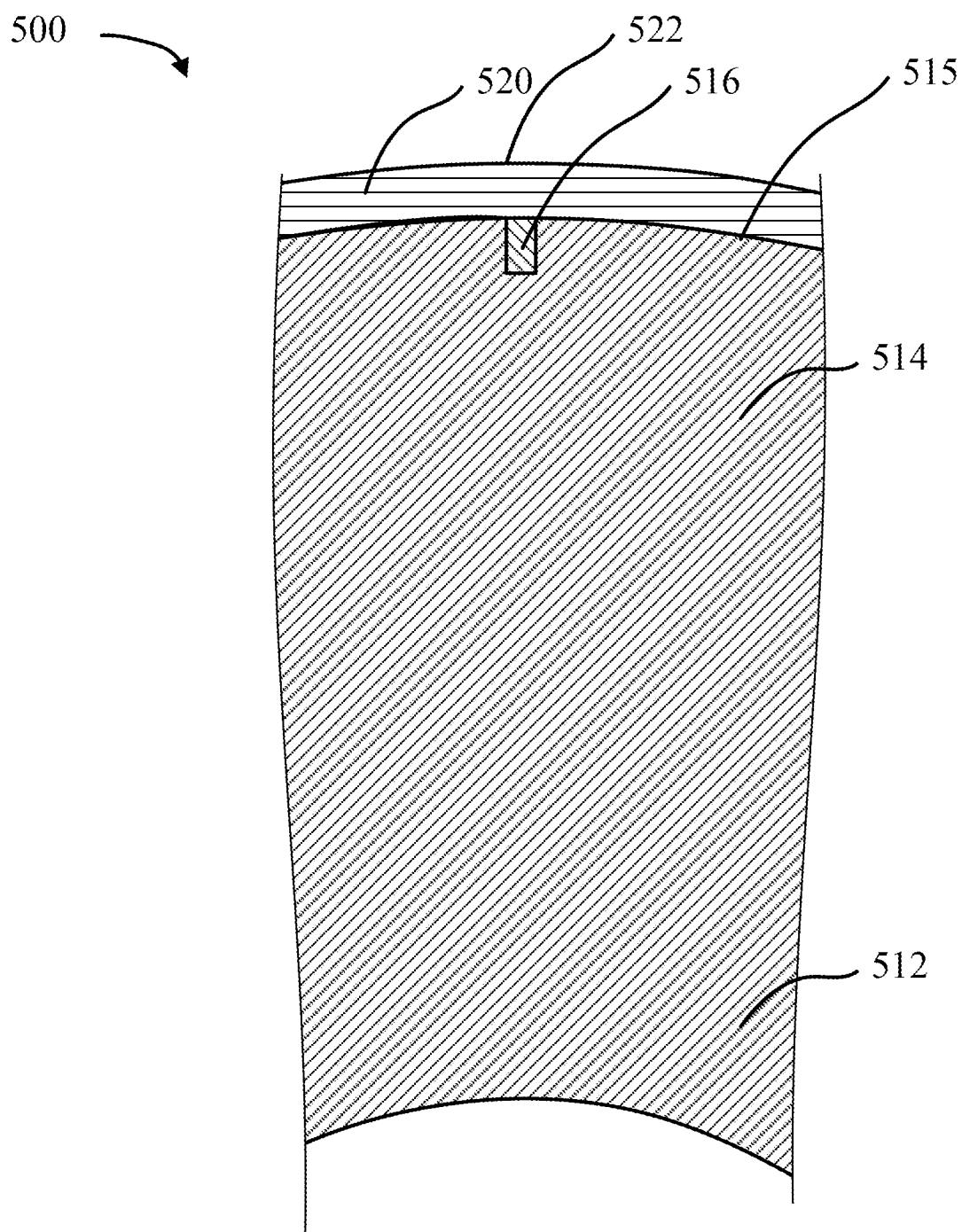
FIG. 5B illustrates a cross-sectional view of a knife edge for a bladed rotor, in accordance with various embodiments.

In various embodiments, during operation of the inspection system 300, broad-band mechanical energy is induced in the IBR 100 with the broad-band acoustic energy source 321 (generated from the acoustic frequency generator 412) for a short period of time (e.g., between 0.1 seconds and 2 seconds, or between 0.1 seconds and 1.5 seconds, or approximately 1.5 seconds). In various embodiments, the acoustic frequency generator 412 disclosed herein is configured to emit an acoustic signal within a predetermined frequency range (e.g., between 1 KHz to about 1 MHz). In various embodiments, any acoustic frequency generator may be utilized. The present disclosure is not limited in this regard. The mechanical energy may induce proximate an area being inspected. For example, with reference now to FIGS. 5A and 5B, an area 500 of an IBR 100 configured to be inspected via the inspection system 300 (e.g., via the optical device 311 and the broad-band energy source 321) is illustrated, in accordance with various embodiments. The area 500 includes at least one knife edge 108. The knife edge 108 comprises a post 512 and a tip 514. The post 512 extends radially outward from a barrel 502 of the IBR 100 at a proximal end to a distal end. The tip 514 extends radially outward from the distal end of the post 512 to a radially outer end 513 of the knife edge 108.

In various embodiments, a coating 520 is disposed on an outer surface 515 of the tip 514. The coating 520 may comprise a ceramic-based coating or the like. The present disclosure is not limited in this regard. In various embodiments, the coating 520 is an abradable coating configured to cut a honeycomb seal of the knife edge seal assembly 109 from FIG. 1B. In various embodiments, the coating 520 is porous. In this regard, fluorescent penetrant inspection (FPI) may be absorbed by the coating 520 and fail to show an underlying defect (e.g., defect 516).

In various embodiments, the inspection system 300 is configured to determine a location, a shape, and a size of a defect 516 of the knife edge 108 that would otherwise not be visible (i.e., due to being disposed entirely underneath the coating 520). In this regard, the combination of the optical device 311, the broad-band energy source 321, the sensor(s) 408, and the sensor(s) 410, the defect 516 may be determined/identified. In this regard, if there is no defect, the coating 520 will not have to be removed to perform the inspection, saving a significant amount of time and cost relative to typical knife edge inspection systems and methods. Furthermore, a location of the defect 516 may be determined, allowing the defect to be addressed locally without removing the coating 520 from the entire knife edge 108, in accordance with various embodiments.

In various embodiments, the defect 516 may be modeled and analyzed during step 204 of method 200. In this regard, the IBR analysis system 220 may be configured to determine whether the defect 516 has a size and/or shape that would not impact sealing capability of the knife edge seal assembly 109, in accordance with various embodiments. Thus, the system 250 disclosed herein may facilitate less repairs, reduce costs, and greatly increase automation relative to typical IBR repair systems, in accordance with various embodiments.

Although described herein with respect to a knife edge 510 with a coating 520 disposed thereon, the present disclosure is not limited in this regard. For example, any sealing surface having a coating disposed thereon, where the sealing surface may develop a defect over time is within the scope of this disclosure.

Referring back to FIGS. 3A, 3B, and 4, in various embodiments, the motor 404 of the control system 400 is operably coupled to the shaft 308 of the control system 400. In various embodiments, the motor 404 may comprise a direct current (DC) stepper, an alternating current (AC) motor or the like. The present disclosure is not limited in this regard. In various embodiments, the sensor(s) 408 include Hall effect sensor(s), optical sensor(s), resolver(s), or the like. In various embodiments, sensor(s) 408 may include sensor(s) configured to detect an angular position of the shaft 308 during an inspection step for an IBR 100 (e.g., step 202 from method 200). In this regard, during inspection of the IBR 100, the controller 301 receives sensor data from the sensor(s) 408. The controller 301 can utilize the sensor data received from the sensor(s) 408 to correlate an angular position of the IBR 100 being inspected with a location of the optical device 311 and/or the scanner 310 as described further herein. In various embodiments, the IBR 100 may remain stationary throughout an inspection process (e.g., inspection step 202 of method 200). Thus, coordinates of the robotic arm may be determined via sensor(s) 408 in a similar manner to orient and construct the IBR 100 being inspected as described further herein. In various embodiments, the control arm 320 may comprises sensor(s) 408 configured to determine a position of the control arm 320 during operation.

In various embodiments, the sensor(s) 410 are configured to detect a position of the scanner 310 during the inspection step 202 of method 200. In this regard, sensor(s) 410 may be position sensors (e.g., capacitive displacement sensors, eddy-current sensors, Hall effect sensors, inductive sensors, optical sensors, linear variable differential transformer (LVDT) sensors, photodiode array sensors, piezoelectric sensors, encoders, potentiometer sensors, ultrasonic sensors or the like). The present disclosure is not limited in this regard. Thus, during inspection of the IBR 100 in accordance with step 202 of method 200, controller 301 is able to determine a location of the scanner 310 and/or optical device 311 and an angular position of the IBR 100 throughout the inspection. Thus, based on the location of the scanner 310 and/or optical device 311, an angular location of the IBR 100 and scanning data received from the scanner 310, a digital map (e.g., a robust point cloud) can be generated during the inspection step 202 of method 200 for the IBR 100 being inspected. In various embodiments, the point cloud encompasses the entire IBR 100 (e.g., between 95% and 100% of a surface area of the IBR 100, or between 99% and 100% of the surface area of the IBR 100). In various embodiments, the point cloud includes details of the defect 516 and the coating 520 fully enclosing the defect 516.

Figure 6:
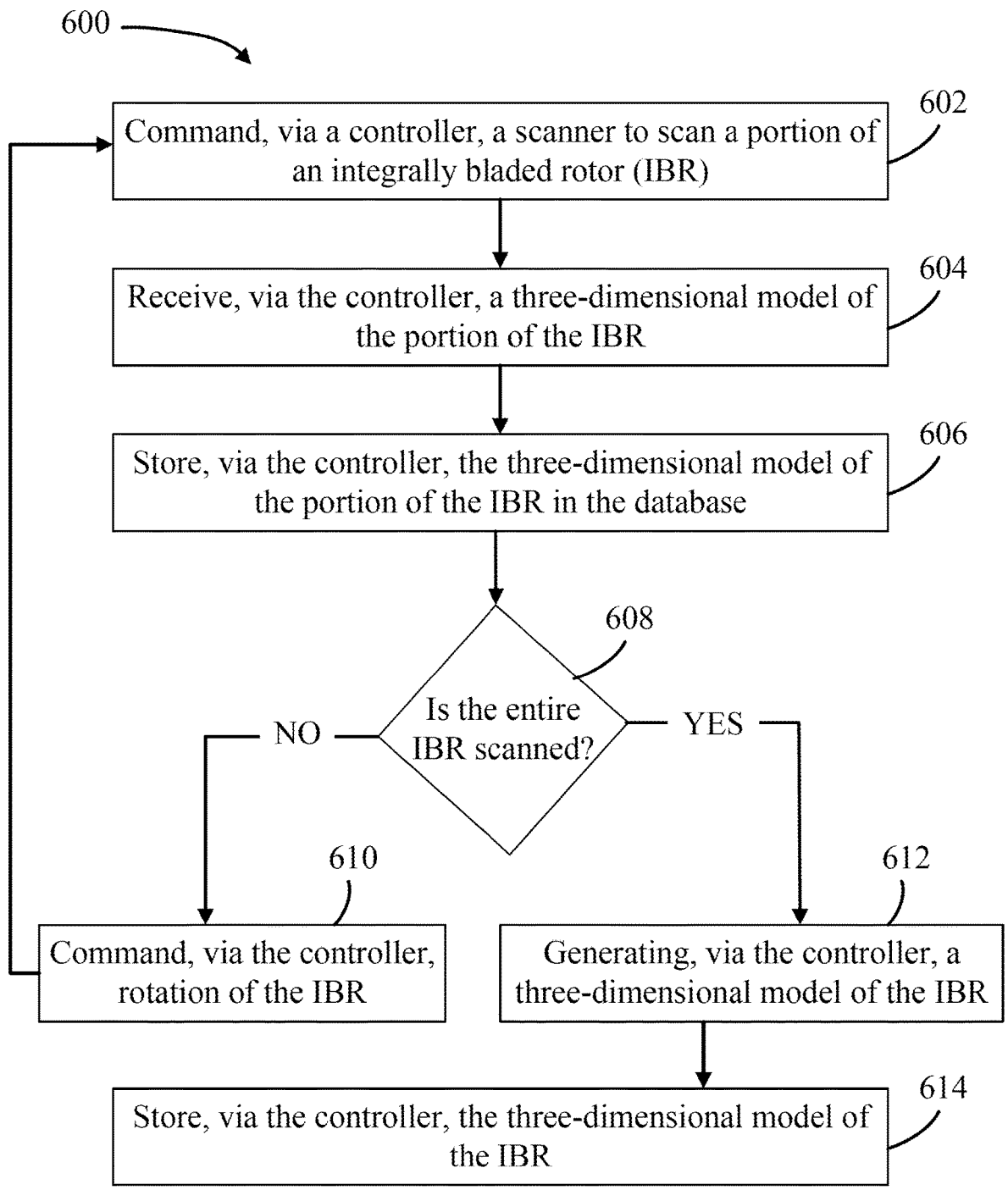
FIG. 6 illustrates a process performed by a control system for a bladed rotor inspection system, in accordance with various embodiments.

Referring now to FIG. 6, a process 600 for inspecting an IBR 100 that is performed by the control system 400 of the inspection system 300 is illustrated, in accordance with various embodiments. In various embodiments, the process 600 comprises commanding, via a controller 301, a scanner 310 to scan a portion of the IBR 100 (step 602). In various embodiments, the portion of the IBR 100 may comprise a blade 101 or the like. In various embodiments, a root, a platform, or the like of the IBR 100 may be the portion. The present disclosure is not limited in this regard. In various embodiments, the root and the platform of the IBR 100 may be scanned along with the blade 101. In various embodiments, multiple blades 101 may be scanned with the portion of the IBR 100.

Figure 8:
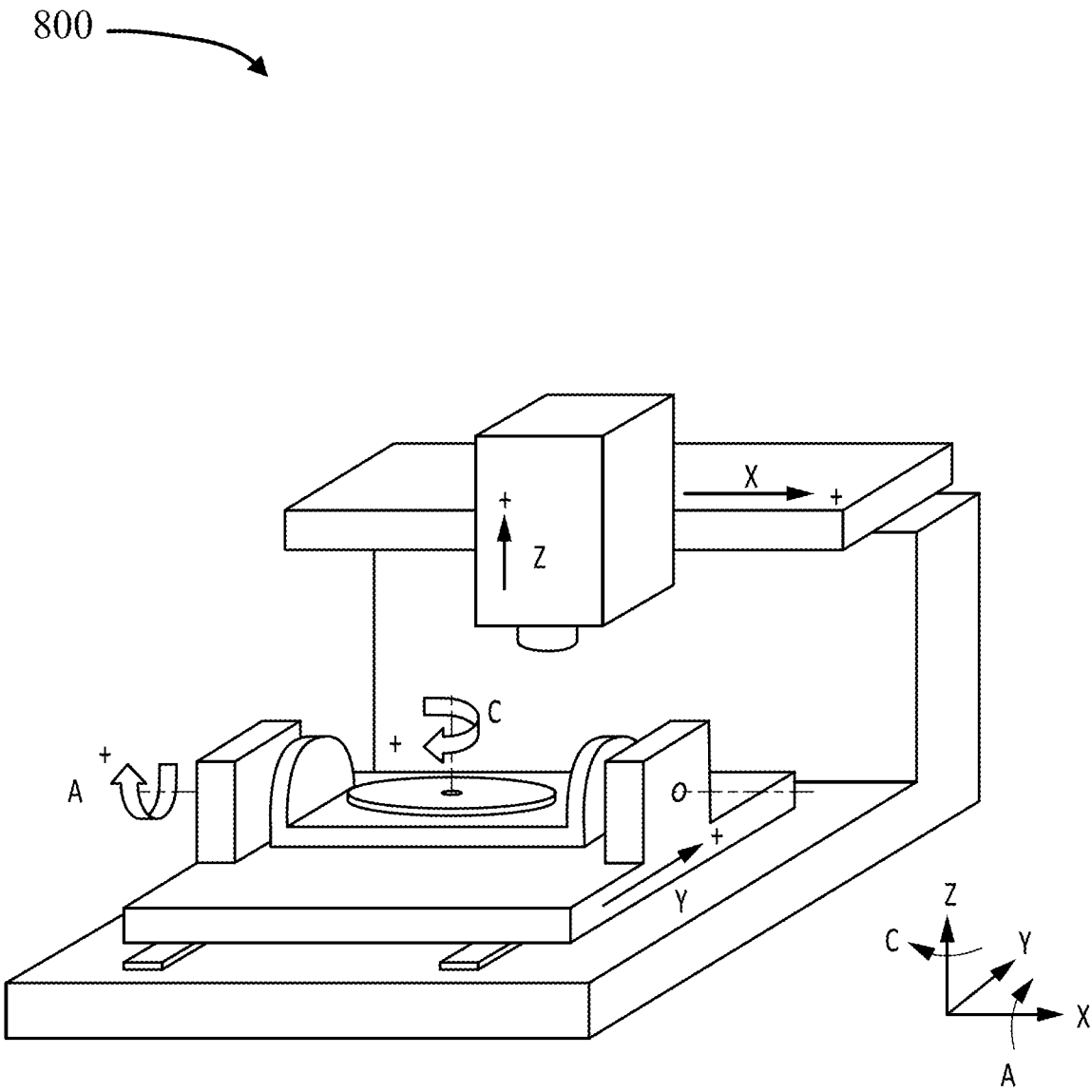
FIG. 8 illustrates a perspective view of a bladed rotor inspection system, in accordance with various embodiments.

In various embodiments, commanding the scanner 310 in step 602 may further comprise commanding rollers of the curved track 314, commanding a conveyor belt or linkages of the vertical track 316 or the like in conjunction with scanning via the scanner 310. In this regard, the controller 301 may provide a predetermined path for the scanner 310 to scan the portion of the IBR 100, in accordance with various embodiments. However, the present disclosure is not limited in this regard, for example, step 602 may include commanding a scanner coupled to a robotic arm (e.g., robotic arm 320 or 322) to scan a portion of the IBR 100, or may include commanding a five-axis system (e.g., system 800 from FIG. 8) to orient the IBR 100 for scanning, or the like. Thus, step 602 may include any command to position the IBR 100 being inspected relative to a scanner 310 and scanning the portion of the IBR 100, in accordance with various embodiments.

The process 600 further comprises receiving, via the controller 301, a three-dimensional model of the first portion of the IBR 100 (step 604). In various embodiments, the three-dimensional model is a digital map (e.g., a point cloud). In this regard, in response to utilizing a CMM scanner or a structured light scanner, the scanner 310 measures discrete points of surfaces of the portion of the IBR being scanned and transmits the discrete points to the controller 301. In various embodiments, the point cloud may be relative to a datum defined by the inspection system 300. For example, the shaft 308 may be configured to couple to the IBR 100 being inspected in exactly the same place every time. In this regard, a datum for the inspection system 300 may be defined in the memory (e.g., memory 214). In various embodiments, the datum is a center point of the IBR 100 (e.g., a center point of the disk of the IBR 100). Thus, the controller 301 is configured to determine a location of each point scanned via the scanner 310 based on the datum, a location of the scanner 310 when a scan occurs during step 602 from sensor(s) 410, measurement data from the scanner 310, and an angular position of the IBR 100 from sensor(s) 408.

The process 600 further comprises storing, via the controller 301, the three-dimensional model in a database 406 (step 606). Although described herein as intermittently storing scanned portions of the IBR 100, the present disclosure is not limited in this regard. For example, the scanner 310 may scan the entire IBR prior to transmitting the three-dimensional model to the controller 301 and still be within the scope of this disclosure. In this regard, the controller 301 may be configured to determine an amount of the IBR 100 that has been scanned based on the angular position of the IBR 100 and the position of the scanner 310 throughout step 602.

The process 600 further comprises determining whether the IBR has been scanned in its entirety (e.g., between 95% and 100% or between 99% and 100% or approximately 100%) (step 608). In this regard, the process 600 may determine whether the scanner 310 has performed a scan at each predetermined arc angle (e.g., 1 degree, 3 degrees, 5 degrees, or the like) and a total angular rotation of the IBR 100 for the scanning process has reached 360 degrees.

If the entire IBR has not been scanned, the process 600 further comprises commanding, via the controller 301, rotation of the IBR 100 a fixed amount (e.g., 1 degree, 3 degrees, 5 degrees, 10 degrees, etc.) (step 610). The present disclosure is not limited in this regard. The controller 301 may command the motor 404 to rotate the IBR 100 the fixed amount, in accordance with various embodiments.

In various embodiments, steps 602, 604, 606, 608 are repeated until the entire IBR is scanned according to step 608, at which point the process 600 further comprises generating, via the controller 301, a three-dimensional model of the IBR 100 (step 612). In this regard, in response to the scanner 310 being a CMM scanner or a structured light scanner, the controller 301 may stitch together the point clouds for each portion of the IBR scanned via step 602 to generate a robust point cloud of the entire IBR 100 (e.g., between 95% and 100% of an external surface area of the IBR 100, or between 99% and 100% of the external surface area of the IBR 100, or approximately 100% of the external surface area of the IBR 100). In various embodiments, the entire IBR 100 refers to approximately 100% of an external surface area of all the blades of the IBR 100.

In various embodiments, the process 600 further comprises storing, via the controller 301, the three-dimensional model of the IBR in the database 406 (step 614). In this regard, the three-dimensional model may be utilized for analyzing the inspected IBR (e.g., in accordance with step 204 of method 200), determining a repair for the inspected IBR (e.g., based on step 204 of method 200) and/or in repairing the inspected IBR (e.g., in accordance with step 206 of method 200).

In various embodiments, the process 600 may provide a fully automated solution for generating a robust three-dimensional model (e.g., a point cloud) for an inspected IBR 100, in accordance with various embodiments.

Figure 7:
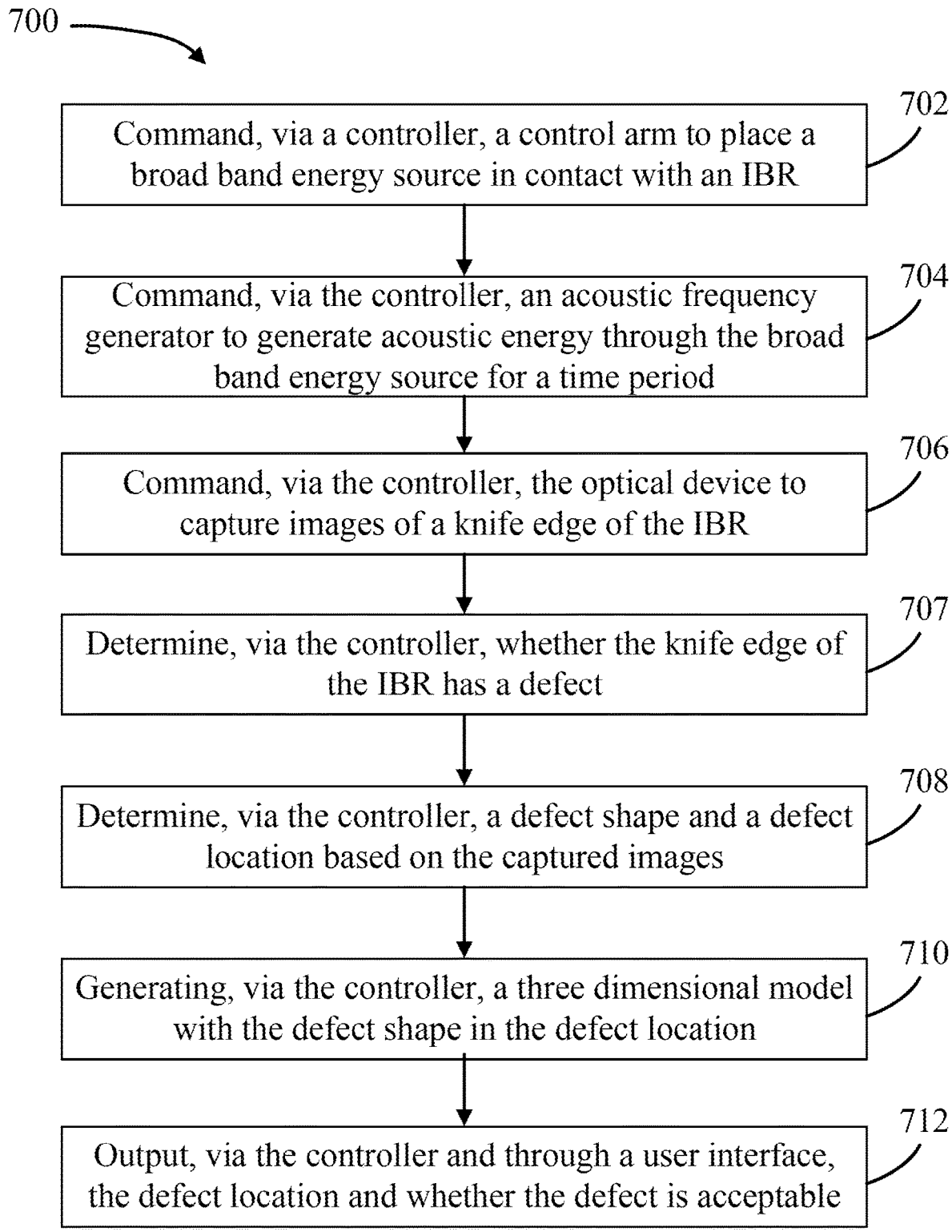
FIG. 7 illustrates a process performed by a control system for a bladed rotor inspection system, in accordance with various embodiments.

Referring now to FIG. 7, a process 700 for inspecting an IBR 100 that is performed by the control system 400 of the inspection system 300 is illustrated, in accordance with various embodiments. In various embodiments, the process 700 may be performed simultaneously with process 600, in between steps of process 600, or the like. The present disclosure is not limited in this regard.

The process 700 comprises commanding, via the controller 301, a control arm 320 to place a broad-band energy source 321 in contact with the IBR 100 being inspected (step 702). The broad-band energy source 321 may be placed in contact with the IBR 100 proximate an area being inspected with the optical device 311. For example, the broad-band energy source 321 may be placed in contact with the barrel 502 of the IBR 100 proximate a knife edge 108 being inspected, in contact with the post 512 of the IBR 100 proximate the tip 514 being inspected, or the like. The present disclosure is not limited in this regard.

The process 700 further comprises commanding, via the controller 301, an acoustic frequency generator 412 to generate acoustic energy through the broad-band energy source 321 for a time period (step 704). In various embodiments, the time period is between 0.1 seconds and 2 seconds, or approximately 1.5 seconds. In various embodiments, the acoustic energy signal emitted from the broad-band energy source 321 is comprise of a plurality of frequencies (e.g., spanning a spectrum of about 1 KHz to about 1 MHz).

The process 700 further comprises commanding, via the controller 301, the optical device 311 to capture thermal images (i.e., thermal image data) of a knife edge 108 of the IBR 100 during the time period from step 704 (step 706). In this regard, the acoustic energy produces mechanical vibrations which excited defective features (e.g., defect 516). Relative motion of the defective feature produces heat, allowing the emission of infrared energy (e.g., via the optical device 311) to detect the heat. Thus, the optical device 311 sends thermal image data (e.g., infrared data) to the controller 301.

The process 700 further comprises determining, via the controller 301, whether the knife edge 108 of the IBR 100 has a defect (step 707). In various embodiments, the knife edge 108 may be compared to an ideal knife edge (e.g., a product definition of a design for the knife edge). In this regard, dimensions of the knife edge 108 may be compared to the ideal knife edge to determine whether the knife edge 108 is within tolerances of the ideal knife edge. In various embodiments, the knife edge may be out of tolerance within a certain margin and may still be considered to not be a defect. The present disclosure is not limited in this regard. In various embodiments, the defect may be determined based on an analysis (e.g., a computational fluid dynamics analysis to indicate whether the knife edge maintains sealing capability). The present disclosure is not limited in this regard.

Based on the infrared data, the controller 301 determines a defect shape (e.g., a defect size, a defect orientation, etc.) and/or a defect location (step 708). For example, based on sensor data from sensor(s) 408 and/or sensor(s) 410 and the infrared data, the controller 301 can determine a defect location for the defect 516 of the knife edge 108. In various embodiments, the defect location can be determined even though the defect is not visible due to the coating 520. In various embodiments, steps 702, 704, 706, and 708 may be repeated for various angular portions of the IBR 100. For example, in between each rotation of the IBR in step 610 of process 600, steps 702, 704, 706, 708 may be performed. Thus, the entire knife edge 108 may be analyzed prior to proceeding to step 710, in accordance with various embodiments. However, the present disclosure is not limited in this regard. For example, defect data may be output to a user interface of the inspection system (e.g., UI 216) as the defect data is determined, in accordance with various embodiments. The present disclosure is not limited in this regard.

In various embodiments, the process 700 further comprises generating, via the controller 301, a three-dimensional model with the defect shape in the defect location (step 710). In various embodiments, the defect shape and the defect location may be stitched into the digital representation of the IBR from process 600 (e.g., a point cloud or the like). In this regard, the defect shape may be modeled and transmitted to the IBR analysis system 220 for analysis of the defect 516. In this regard, the defect 516 may be analyzed via structural analysis or the like to determine whether the defect 516 is acceptable or if the defect 516 should be addressed.

In various embodiments, the process 700 further comprises outputting, via the controller 301 and through a user interface (e.g., UI 216), a defect location and/or whether the defect 516 is acceptable (step 712). In this regard, a defect 516 may be detected and a location determined via process 700 in an automated manner via process 700. Additionally, in various embodiments, the defect 516 may be detected without removing the coating 520 from the knife edge 108, which may save significant time during a repair process 200 for the IBR 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An inspection device, comprising:
   a support structure comprising a base having an arcuate shape;
   a motor;
   a shaft operably coupled to the motor, the shaft extending from a first side of the support structure to a second side of the support structure, the shaft configured to couple to a bladed rotor;

an optical device moveably coupled to the support structure;
a track system, the optical device configured to move along the track system, the track system comprising:
a curved track coupled to a radially inner surface of the base and extending circumferentially around the base, and
a vertical track, the optical device operably coupled to the vertical track, the vertical track configured to travel along the curved track; and
a broad-band energy source configured to generate acoustic energy through the bladed rotor during inspection.

2. The inspection device of claim 1, further comprising a control arm configured to place the broad-band energy source in contact with the bladed rotor during inspection.

3. The inspection device of claim 2, further comprising an acoustic frequency generator in operable communication with the broad-band energy source.

4. The inspection device of claim 3, further comprising a controller operably coupled to the motor, the optical device and the acoustic frequency generator.

5. The inspection device of claim 4, wherein the controller is configured to:
command the control arm to place the broad-band energy source in contact with the bladed rotor;
command the acoustic frequency generator to generate the acoustic energy through the broad-band energy source;
command the optical device to capture thermal images of a knife edge of the bladed rotor; and
determine a defect shape and a defect location based on data from the optical device.

6. The inspection device of claim 5, further comprising a user interface.

7. The inspection device of claim 6, wherein the controller is further configured to output through the user interface, the defect location in response to determining the defect shape and the defect location.

8. The inspection device of claim 5, wherein the controller is further configured to generate a three dimensional model with the defect shape in the defect location.

9. The inspection device of claim 5, wherein the controller is further configured to generate a point cloud with the defect shape in the defect location based on scanning the bladed rotor.

10. An article of manufacture including a tangible, non-transitory computer-readable storage medium having instructions stored thereon that, in response to execution by a processor, cause the processor to perform operations comprising:
performing, by the processor, a knife edge inspection cycle, the knife edge inspection cycle comprising:
commanding, by the processor, placement of a broad-band energy source in contact with a portion of a knife edge of an integrally bladed rotor (IBR), the knife edge having a coating disposed at least partially thereon;
commanding, by the processor, an acoustic frequency generator to generate acoustic energy through the broad-band energy source;
command, by the processor, an optical device to capture thermal image data of the portion of the knife edge while the acoustic energy is generated;
rotating, by the processor and via an inspection device, the IBR;
repeating the knife edge inspection cycle until the knife edge is inspected in its entirety;
determining, by the processor, whether the knife edge has a defect; and
in response to determining the knife edge has the defect, determine, by the processor, a defect shape and a defect location based on captured thermal image data from the optical device.

11. The article of manufacture of claim 10, wherein the operations further comprise generating, by the processor, a three-dimensional model with the defect shape in the defect location.

12. The article of manufacture of claim 11, wherein the three-dimensional model is a point cloud.

13. The article of manufacture of claim 12, wherein the operations further comprise transmitting the three-dimensional model to an IBR analysis system.

14. The article of manufacture of claim 10, wherein the operations further comprise outputting, by the processor and through a user interface, the defect location, a defect size and a defect orientation.

15. A method, comprising:
receiving a bladed rotor at one of a maintenance interval or an unscheduled maintenance;
coupling the bladed rotor to an inspection device, the inspection device comprising broad band energy source and an optical device;
applying, by the broad band energy source, an acoustic energy to a portion of a knife edge of the bladed rotor;
capturing, by the optical device, thermal image data while applying the acoustic energy;
rotating, by the inspection device, the bladed rotor;
repeating the applying the acoustic energy to the portion of the knife edge and the capturing the thermal image data until an entirety of the knife edge is inspected;
determining based on the thermal image data, whether the knife edge has a defect, the knife edge having a coating disposed at least partially thereon; and
determining, based on an angular location of the bladed rotor and a location of the optical device during the applying the acoustic energy and the capturing the thermal image data, a location of the defect.

16. The method of claim 15, further comprising removing the coating in response to determining a defect location of the defect.

17. The method of claim 16, further comprising repairing of the defect.

18. The method of claim 17, further comprising re-coating the knife edge.

19. The method of claim 15, further comprising scanning, by a scanner of the inspection device, the bladed rotor and generating a three-dimensional model with the defect based on the scanning and the thermal image data, wherein the scanner is a separate and distinct component relative to the broad band energy source and the optical device.

20. The method of claim 19, wherein the three-dimensional model is generated at least in part from a point cloud generated in response to scanning the bladed rotor.

* * * * *